United States Patent
Zavdi

(10) Patent No.: US 12,316,659 B2
(45) Date of Patent: May 27, 2025

(54) IDENTIFYING DYNAMIC IP ADDRESS CYBERATTACKS

(71) Applicant: NUCLEON CYBER LTD., Kefar Saba (IL)

(72) Inventor: Moran Zavdi, Kefar Saba (IL)

(73) Assignee: NUCLEON CYBER LTD., Kefar Saba (IL)

( * ) Notice: Subject to any disclaimer, the term of this patent is extended or adjusted under 35 U.S.C. 154(b) by 110 days.

(21) Appl. No.: 17/912,626

(22) PCT Filed: Feb. 4, 2021

(86) PCT No.: PCT/IL2021/050135
§ 371 (c)(1),
(2) Date: Sep. 19, 2022

(87) PCT Pub. No.: WO2021/186425
PCT Pub. Date: Sep. 23, 2021

(65) Prior Publication Data
US 2023/0140533 A1    May 4, 2023

(30) Foreign Application Priority Data
Mar. 18, 2020    (IT) ........................ 102020000005803

(51) Int. Cl.
*H04L 9/40* (2022.01)

(52) U.S. Cl.
CPC ...... *H04L 63/1425* (2013.01); *H04L 63/0236* (2013.01); *H04L 63/1458* (2013.01)

(58) Field of Classification Search
CPC ............. H04L 63/1408; H04L 63/1425; H04L 63/1458; H04L 63/0236; H04L 63/0254; H04L 43/106
See application file for complete search history.

(56) References Cited

U.S. PATENT DOCUMENTS 8,495,740 B1 * 7/2013 Rouland ............. H04L 63/1433
726/25
10,476,906 B1 * 11/2019 Siddiqui ................. H04L 63/18
(Continued)

FOREIGN PATENT DOCUMENTS

CN      109286579 A      1/2019
EP      3617922 A1 *     3/2020 ............. G06F 21/44

OTHER PUBLICATIONS

Borman, David, et al. "RFC 7323: TCP Extensions for High Performance." IETF Datatracker, Sep. 2014, datatracker.ietf.org/doc/html/rfc7323. (Year: 2014).*

(Continued)

*Primary Examiner* — Theodore C Parsons
*Assistant Examiner* — James P Moles
(74) *Attorney, Agent, or Firm* — The Roy Gross Law Firm, LLC; Roy D. Gross

(57) ABSTRACT

A system and methods of cybersecurity are provided, implementing: receiving multiple TCP/IP packets destined for a target host; determining from among the multiple TCP/IP packets, a subset of suspicious TCP/IP packets characterized by one or more suspicious traits; for each of the TCP/IP packets characterized by the one or more suspicious traits, extracting a TCP/IP timestamp header value and calculating a normalized timestamp value by subtracting a local system time from the TCP/IP timestamp header value; identifying a subgroup of the TCP/IP packets having a common normalized timestamp value indicative of generation by a common source host; receiving a subsequent TCP/IP packet destined for the target host; determining that the subsequent TCP/IP packet's normalized timestamp value is the common normalized timestamp value; and responsively blocking the subsequent TCP/IP packet from reaching the target host.

16 Claims, 2 Drawing Sheets

100

| msg # | Local (secs) | 500 ms increments | msg IP address | msg TSval | normalized (500 ms) |
|---|---|---|---|---|---|
| 1 | 00:00:00 | 0 | 1.1.1.2 | 2860513 | 2860513 |
| 2 | 00:00:45 | 90 | 5.3.2.4 | 1732577813 | 1732577723 |
| 3 | 00:00:47 | 94 | 71.1.1.1 | 1732577818 | 1732577724 |
| 4 | 00:01:10 | 140 | 101.1.1.3 | 2762842 | 2762702 |
| 5 | 00:01:15 | 150 | 56.34.2.12 | 580513890 | 580511460 |
| 6 | 00:01:54 | 228 | 25.35.1.1 | 1732578050 | 173257772 |
| 7 | 00:01:57 | 234 | 26.55.3.3 | 63741 | 63507 |

(56) References Cited

U.S. PATENT DOCUMENTS

2015/0142564 A1* 5/2015 Lissack ................ H04L 67/535
709/227
2018/0150432 A1* 5/2018 Jiang ....................... H04L 43/16

OTHER PUBLICATIONS

Wright, Gary, and W. Stevens. TCP/IP Illustrated, vol. 2: The Implementation. 1st edition, Pearson Education, Limited, 1995. (Year: 1995).*

Osanaiye Opeyemi et al., "TCP/IP header classification for detecting spoofed DDoS attack in Cloud environment"; IEEE EUROCON 2015—International Conference on Computer as a Tool (EUROCON), Sep. 8, 2015; pp. 1-6, 6 pages.

K. Poon Sun et al.; "Use of TCP timestamp option to depend against blind spoofing attack draft-poon-top-tstamp-mod-01.tex"; Internet Scoiety (ISOC) 4, Rue des Falaises CH—1205 Geneva, Switzerland, No. 1, Oct. 24, 2004; 25 pages.

International search report for PCT/IL21/50135 dated Jul. 8, 2021.
Written Opinion for PCT/IL21/50135 dated Jul. 8, 2021.

* cited by examiner

100

| msg # | Local (secs) | 500 ms increments | msg IP address | msg TSval | normalized (500 ms) |
|---|---|---|---|---|---|
| 1 | 00:00:00 | 0 | 1.1.1.2 | 2860513 | 2860513 |
| 2 | 00:00:45 | 90 | 5.3.2.4 | 1732577813 | 1732577723 |
| 3 | 00:00:47 | 94 | 71.1.1.1 | 1732577818 | 1732577724 |
| 4 | 00:01:10 | 140 | 101.1.1.3 | 2762842 | 2762702 |
| 5 | 00:01:15 | 150 | 56.34.2.12 | 580513890 | 580511460 |
| 6 | 00:01:54 | 228 | 25.35.1.1 | 1732578050 | 173257772 |
| 7 | 00:01:57 | 234 | 26.55.3.3 | 63741 | 63507 |

IDENTIFYING DYNAMIC IP ADDRESS CYBERATTACKS

CROSS REFERENCE TO RELATED APPLICATIONS

This application is a National Phase of PCT Patent Application No. PCT/IL2021/050135 having International filing date of Feb. 4, 2021, which claims the benefit of priority of Italian Patent Application No. 102020000005803, filed Mar. 18, 2020, the contents of which are all incorporated herein by reference in their entirety.

FIELD OF THE INVENTION

The present invention relates to the field of cybersecurity and computer network architectures.

BACKGROUND

In distributed denial of service (DDoS) cyberattacks, a targeted computer system is attacked by a large number of false communications to prevent the system from responding to valid communications. Methods of implementing an attack may include UDP floods, ICMP floods, protocol attacks such as SYN floods, fragmented packet attacks, ping floods ("Ping of Death"), Smurf attacks, and application layer attacks.

A commonly used solution for protecting a computer system against such attacks is to block all TCP/IP packets (also referred to hereinbelow as "messages") from an IP address of a computer that is the source of false communications. However, attacks may be launched using "dynamic IP" addresses, which hide from the recipient computer the address of the originating computer. If a message designed as part of an attack is not identified by an originating IP address, it may not be blocked from reaching a target host, and thus may be able to establish communications links with the target host. These attacks may also incorporate additional sophisticated means of avoiding other types of protection filters, such as filters that drop messages that do not follow human browsing patterns. Consequently, such attacks are difficult to block even for large attacks of false messages. IP-based methods of defense cannot differentiate between the cyberattack messages and messages from legitimate visitors.

Attacks made using dynamic IPs require a large pool of IP addresses. Attackers can gain access to this pool in a variety of ways, such as hacking by a botnet, by obtaining a list of SOCKS proxies, by using certain VPN services, or by buying certain cloud services. Users who are part of a botnet might not even realize that their computer is infected. Personal routers or modems are easy targets for being hijacked by a botnet, and with the Internet of Things the variety and range of infected devices is slated to sharply increase. Hobbyist forums often provide lists of SOCK proxies to their users. These forums often host a number of different attack tools and scripts that can abuse these lists to generate false traffic, which is generally indiscernible from real traffic. VPN services such as Hotspot Shield, TunnelBear, and CyberGhost offer a large pool of IP addresses, in some cases over 100,000 addresses. In some cases, unscrupulous VPN hosts may 'rent out' their services to criminal agents to be used as botnets.

Methods are needed to identify such cyberattack messages that rely on dynamic IP addresses.

SUMMARY

Embodiments of the present invention provide a means of identifying cyberattack messages that are generated from dynamic IP addresses.

In some embodiments, a system and methods of cybersecurity are provided, implementing: receiving multiple TCP/IP packets destined for a target host; determining from among the multiple TCP/IP packets, a subset of suspicious TCP/IP packets characterized by one or more suspicious traits; for each of the TCP/IP packets characterized by the one or more suspicious traits, extracting a TCP/IP timestamp header value and calculating a normalized timestamp value by subtracting a local system time from the TCP/IP timestamp header value; identifying a subgroup of the TCP/IP packets having a common normalized timestamp value indicative of generation by a common source host; receiving a subsequent TCP/IP packet destined for the target host; determining that the subsequent TCP/IP packet's normalized timestamp value is the common normalized timestamp value; and responsively blocking the subsequent TCP/IP packet from reaching the target host.

The suspicious traits may be one or more of fragmented ICMP and SYN packets, non-standard protocols, undefined protocol values, and incorrect formats of packet header fields. The multiple TCP/IP packets may be TCP/IP packets received for a preset time duration. The common normalized timestamp value may be a value that differs between the TCP/IP packets of the subgroup by no more than a predefined threshold. Identifying the subgroup of the TCP/IP packets having a common normalized timestamp value may also include sending the common normalized timestamp value and additional data of the subgroup to a cyber administrator to identify additional common traits of the subgroup.

A time interval of the TCP/IP timestamp header may be unknown, in which case calculating the normalized timestamp value may include calculating multiple normalized timestamp values to detect a common normalized timestamp value at one of multiple possible time intervals of the TCP/IP timestamp header.

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the figures.

DETAILED DESCRIPTION

Figure 1:
FIG. 1 is a table of TCP timestamps, created to monitor potential cyberattack packets, in accordance with an embodiment of the present invention.

Embodiments of the present invention provide methods for distinguishing cyberattack messages from legitimate messages. The methods are based on exploiting the TCP timestamp feature of TCP/IP messaging, a feature defined by RFC 7323 of the Internet Engineering Task Force (IETF), entitled, "TCP Extensions for High Performance," which is incorporated herein by reference.

Timestamp fields of a TCP/IP packet are optional, but if provided are allocated 10-12 bytes in the header (for each packet). The bytes of the TCP timestamp fields for the timestamp option (TSopt) are typically configured as follows:

| Kind = 8 | 10 | TS Value (TSval) | TS Echo Reply (TSecr) |
|---|---|---|---|
| 1B | 1B | 4B | 4B |

As shown, there are typically two four-byte timestamp fields implemented with the timestamp option. The TSval field is the current value of the timestamp clock of the device sending a TCP segment. The echo reply (TSecr) field is sent in acknowledgement segments, i.e., when the ACK bit is set in the TCP header. (If the ACK bit is not set in the header of a segment, the TSecr field should be zero. When the ACK bit is set, the sender MUST echo a recently received TSval field sent by the remote TCP.)

The timestamp clock of a sending host is typically initialized to zero when its system is booted up, such that the timestamp reflects a host "uptime." Alternatively, the value may be initialized to a random value. When a timestamp value is needed, the timestamp clock is adjusted as necessary to make the new value equal to or larger than the previous value. In this manner, the timestamp clock provides monotonic non-decreasing values for the timestamp field of TCP/IP packets (also referred to hereinbelow as TCP/IP packets or segments, or simply, as "messages").

According to RFC 7323, the timestamps are typically used for at least two distinct mechanisms: Round Trip Time Measurement (RTTM) and Protect Against Wrapped Sequences (PAWS).

According to RFC 7323, the timestamp values do not necessarily reflect connection to fixed time intervals, but timestamp increments do typically indicate increments of between 1 ms and 1 second. As described by Li, et al., in "A study of precision of hardware time stamping packet traces," 10.1109/ISPCS.2014.6948700, which is incorporate herein by reference, timestamp intervals are system dependent and are not controlled or known by the receiving computer. In addition, the timestamps may be implemented in software or in hardware, typically by a network interface card (NIC) of a host computer system. The most common increment value is 500 ms, as described in TCP/IP Illustrated, Volume 2: The Implementation, Gary R. Wright and W. Richard Stevens, Addison-Wesley Professional, 1995, which is incorporate herein by reference.

The IETF Internet Draft by Trammell, et al., "Exposure of Time Intervals for the TCP Timestamp Option," Oct. 14, 2012, at tools.ietf.org (hereinbelow, "Trammell"), which is incorporated herein by reference, describes that encodings for common timestamp intervals may range from 60 ns to 16 seconds. Trammell suggests using a TCP magic number for exporting a timestamp interval as one alternative for enabling a receiver to know the timestamp interval (magic numbers being described at IETF Internet Draft by Touch, entitled, "Shared Use of Experimental TCP Options," Oct. 5, 2012, which is incorporate herein by reference.) Alternatively, Trammell suggests a mechanism for timestamp interval negotiation between sender and receiver, a method that is described in IETF Internet Draft by Scheffenegger, et al., entitled, "Additional negotiation in the TCP Timestamp Option field during the TCP handshake," Jul. 16, 2012, which is incorporate herein by reference. With the implementation of such enhancements, a wider range of timestamp field options may be included in packets. For example, instead of, or in addition to, timestamps that indicate a time since a system reboot, timestamps may indicate an "epoch" time, that is a time since a fixed historical time, such as Jan. 1, 1970. (Given the bit limitation of the header, setting the increment to 1 ms would mean that the clock value was reset every approximately 24 days.)

FIG. 1 shows a TCP timestamp table 100 that contains certain header data from TCP/IP packets received by a system, in accordance with an embodiment of the present invention. Typically, incoming TCP/IP packets are monitored by a front-end device of the receiving system, such as a NIC. The front-end device may also perform additional tasks, such as scanning incoming TCP/IP packets to block suspicious packets from reaching a system server, or to flag such suspicious packets for further evaluation.

In embodiments of the present invention, a front-end device of a network-connected computer system is configured to analyze groups of in-coming TCP/IP packets. The grouping of the packets is typically performed according to fixed time durations; that is, all packets received during a given time period are grouped together for analysis. For all the packets of a given group, various parameters of the header and contents of each packet may first be analyzed to determine whether the packet should be flagged as suspicious. A wide variety of parameters may trigger such a determination, including: fragmented ICMP and SYN packets, non-standard protocols, undefined protocol values, incorrect formats of packet header fields, etc.

For any packet considered suspicious, the TCP timestamp is then extracted and stored, together with other identifying data related to the given packet. Alternatively, filtering of suspicious packets may be skipped, such that TCP timestamps of all packets received during a given time period are stored. The timestamp values are assumed to represent time values from sending systems, i.e., values that are incremented with time, for example, system times that are initialized to zero upon system boot. The table 100 is one representative method of storing the timestamp data; other storage methods known in the art may also be utilized.

In the example of table 100, the TSval timestamp of each packet is stored together with a local, incremental system time when the packet was received, that is, a time interval from the start of the group time period. Each packet source IP address is also stored. For each packet, these data values are also stored together with one or more "normalized" timestamp fields, which are calculated as the timestamp value minus the time increment of the local system. As described above, the time units of the timestamp of the incoming packet may not be known. That is, the time units may be, for example, in seconds or in milliseconds, or other units as described above. Consequently, several "normalized" fields may be calculated, to normalize for multiple possible time intervals, such as seconds or milliseconds, in addition to a standard increment of 500 ms. When a subset of packets have approximately the same normalized values (for any calculated increment), these packets are then considered as possibly coming from the same source host.

In the table 100 shown in the figure, seven received packets are indicated, as examples of packets that would be received during a given time frame being analyzed. Typically, hundreds or thousands of packets would be received during a selected time frame period. The first packet received during the time frame may be assigned a "local time" initialized to zero. The "local time" is an incremental time for receipt of packets in the group. This time is typically determined by storing a system clock value at the time of the first packet receipt, which is then subtracted from each system clock value recorded for each subsequent packet in the group. Because timestamps are typically incremented in time increments of 500 ms, the local time is also incremented in 500 ms increments (column 3 of table 100).

As indicated in table 100, packets were subsequently received at local incremental times of 90, 94, 140, 150, 228, and 234. (In some embodiments, these received packets may reflect a subgroup of all received packets that include "suspicious" traits, as described above.)

For each of the received packets shown, a normalized timestamp field is calculated by subtracting the local incremental time from the timestamp. The normalized timestamps are shown in column 6. As shown, packets 2, 3, and 6 have approximately the same normalized timestamp, or "timestamp signature." The difference between these three normalized timestamps is only several time increments (e.g., a range of one second, given that the increment is 500 ms). This is an indication that even though the IP addresses of the source hosts are different, these are likely to be "dynamic" or "spoofed" addresses and the same source host actually sent all three packets. In some embodiments, a threshold of normalization error is set to determine a range of packets that may be considered to come from the same source host. This range would typically reflect the expected range of latency of transmission from source hosts. All packets having a timestamp not differing from a median value by more than the threshold of normalization error would be considered as having been sent by the same source host.

Given that several packets were identified as having almost identical timestamp signatures, these packets may be filtered from reaching the target computer system, or these packets may be directed to a cyber-defense system for further analysis.

Figure 2:
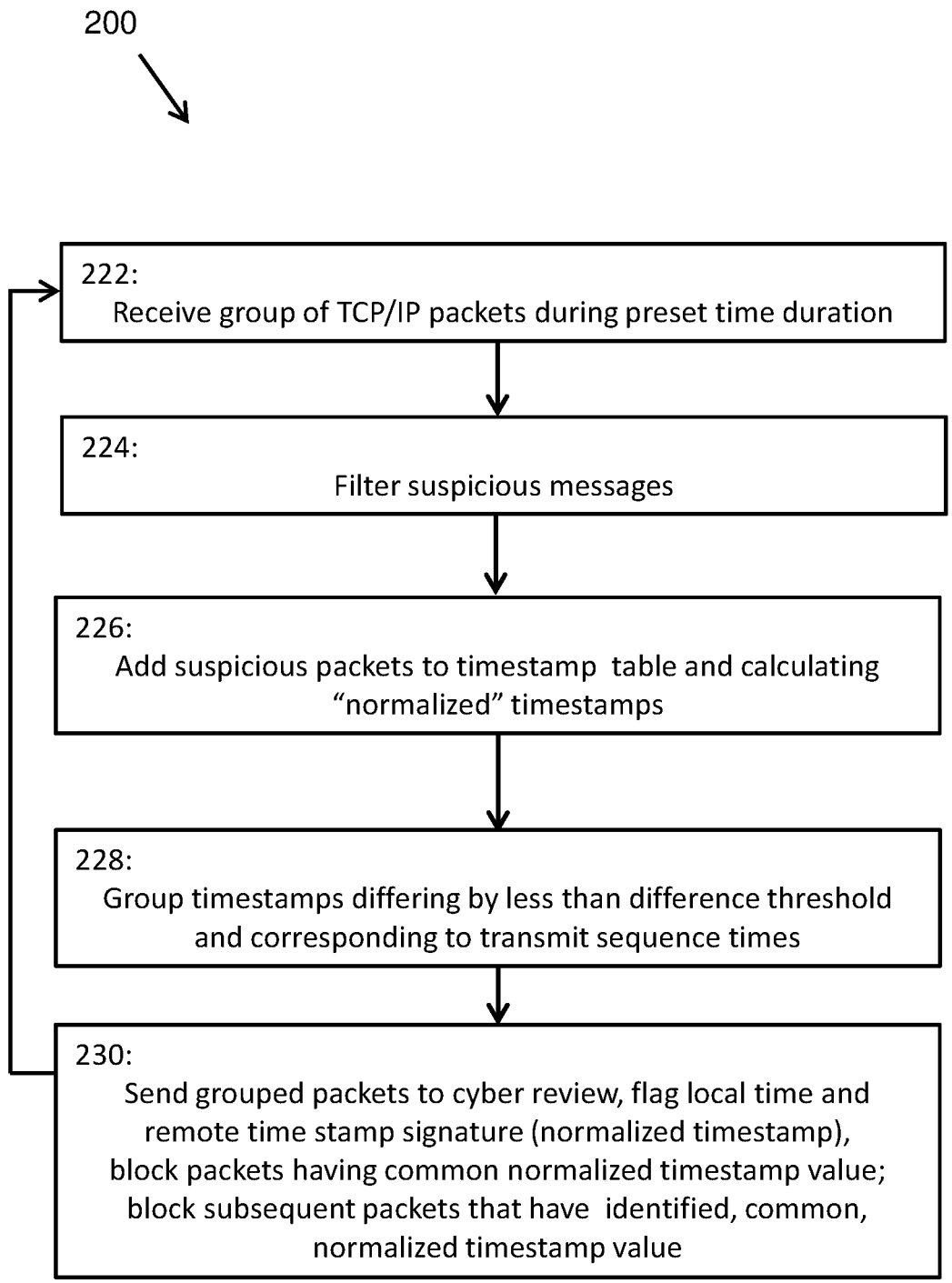
FIG. 2 is a flow diagram of monitoring potential cyberattack TCP/IP packets, in accordance with an embodiment of the present invention.

FIG. 2 is a flow diagram of a process 200 of monitoring potential cyberattack packets, in accordance with an embodiment of the present invention.

A front-end network device or application, such as a router or firewall, is configured to scan incoming TCP/IP packets destined for a target host computer and to group the packets into groups according to preset time periods. At a step 222, the device receives and scans multiple TCP/IP packets over a given period of time, recording for each packet a local system time associated with the time of packet receipt. The front-end network device may simply scan the packets to perform the analysis described below and pass them on to the computer system being addressed by the packets. Alternatively, the device may block certain packets, as described below.

At a step 224, the front-end network device or application may perform an analysis of the incoming packets, determining which packets include suspicious parameters, as described hereinabove. Packets that do not include suspicious parameters may be ignored in subsequent processing by the device, and are typically routed to the destination host computer. Alternatively, filtering of suspicious packets may be omitted, such that all packets are processed in the subsequent steps.

At a step 226, data from packets considered suspicious at step 224 are saved in a timestamp table, such as the timestamp table 100. The data saved typically includes the fields described above with respect to table 100, such as the TCP timestamp and the IP address included in the incoming TCP/IP packet, as well as the local system time when the packet was received. In addition, one or more normalized timestamp values (NTVs) are calculated, assuming one or more increments of time represented by the timestamps.

At a step 228, packets having NTVs that differ by less than a nominal amount (i.e., a preset threshold), are grouped together to indicate that they may have come from a common originating source host. That is, packets that have a common NTV are grouped.

At a final step 230, packets grouped by a common NTV may be sent for review to a cyber analysis process, which may be performed by a human administrator or by an automated method, to identify additional common traits that may assist in protecting the system against cyberattack from such packets. In addition, the packets grouped by a common NTV may be blocked from reaching the destination host computer. In addition, the common NTV may be applied to block subsequent packets that are determined to have the same common NTV.

Typically, process 200 is iterative, that is, following step 230 the process continues again at step 222. In an iterative mode, the subsequent packets that are blocked due to having an identified common NTV are received by the front-end device (or application) together with a new group of packets received during the preset time duration. Typically, these packets are filtered from the data stream, i.e., blocked from reaching the destination host computer, before step 224 and subsequent steps are performed.

The front-end device or application implementing the above described method may be an add-on, or upgrade, or a retrofit to a commercial product for cybersecurity. Processing elements of the system described herein may be implemented in digital electronic circuitry, or in computer hardware, firmware, software, or in combinations thereof. Such elements can be implemented as a computer program product, tangibly embodied in an information carrier, such as a non-transient, machine-readable storage device, for execution by, or to control the operation of, data processing apparatus, such as a programmable processor, computer, or deployed to be executed on multiple computers at one site or one or more across multiple sites. Memory storage for software and data may include multiple one or more memory units, including one or more types of storage media. Examples of storage media include, but are not limited to, magnetic media, optical media, and integrated circuits such as read-only memory devices (ROM) and random access memory (RAM). Network interface modules may control the sending and receiving of data packets over networks. Method steps associated with the system and process can be rearranged and/or one or more such steps can be omitted to achieve the same, or similar, results to those described herein.

It is to be understood that the embodiments described hereinabove are cited by way of example, and that the present invention is not limited to what has been particularly shown and described hereinabove.

The invention claimed is:

1. A computer-based system for cybersecurity comprising a processor and a memory, the memory comprising instructions that when executed by the processor cause the processor to implement steps of:

receiving multiple TCP/IP packets destined for a target host;

determining from among the multiple TCP/IP packets, a subset of suspicious TCP/IP packets characterized by one or more suspicious traits;

for each of the TCP/IP packets characterized by the one or more suspicious traits, extracting a TCP/IP timestamp header value and calculating a normalized timestamp value by subtracting a local system time from the TCP/IP timestamp header value;

identifying a subgroup of the TCP/IP packets having a common normalized timestamp value range, indicative of packet generation by a common source host, wherein identifying the subgroup further comprises identifying a time interval of increments of the timestamps of the subgroup by calculating multiple normalized timestamp values at multiple possible time intervals;

receiving a subsequent TCP/IP packet destined for the target host;

determining that the subsequent TCP/IP packet's normalized timestamp value is in the common normalized timestamp value range; and responsively blocking the subsequent TCP/IP packet from reaching the target host.

2. The system of claim 1, wherein the suspicious traits are one or more of fragmented ICMP and SYN packets, non-standard protocols, undefined protocol values, and incorrect formats of packet header fields.

3. The system of claim 1, wherein the multiple TCP/IP packets are a set of TCP/IP packets received for a preset time duration.

4. The system of claim 1, wherein the normalized timestamp values of TCP/IP packets of the subgroup differ by no more than a predefined threshold that defines the common normalized timestamp value range.

5. The system of claim 1, wherein identifying the subgroup of the TCP/IP packets having a common normalized timestamp value further comprises sending the common normalized timestamp value and additional data of the subgroup to a cyber administrator to identify additional common traits of the subgroup.

6. The system of claim 1, wherein the TCP/IP timestamp header values represent time increments of a given time interval, and wherein calculating the normalizing timestamp value comprises subtracting the local system time from a time represented by the time increments of the given time interval.

7. The system of claim 6, wherein the given time interval is between 1 ms and 1 second.

8. The system of claim 1, wherein a time interval of increments of a TCP/IP timestamp header value is 500 ms and calculating the normalized timestamp value comprises representing the local system time in 500 ms increments.

9. A method for cybersecurity implemented by a processor and a memory, the memory comprising instructions that when executed by the processor cause the processor to implement the method of:

receiving multiple TCP/IP packets destined for a target host;

determining from among the multiple TCP/IP packets, a subset of suspicious TCP/IP packets characterized by one or more suspicious traits;

for each of the TCP/IP packets characterized by the one or more suspicious traits, extracting a TCP/IP timestamp header value and calculating a normalized timestamp value by subtracting a local system time from the TCP/IP timestamp header value;

identifying a subgroup of the TCP/IP packets have a common normalized timestamp value, wherein identifying the subgroup further comprises identifying a time interval of increments of the timestamps of the subgroup by calculating multiple normalized timestamp values at multiple possible time intervals; and blocking the subgroup of TCP/IP packets from reaching the target host.

10. The method of claim 9, wherein the suspicious traits are one or more of fragmented ICMP and SYN packets, non-standard protocols, undefined protocol values, and incorrect formats of packet header fields.

11. The method of claim 9, wherein the multiple TCP/IP packets are a set of TCP/IP packets received for a preset time duration.

12. The method of claim 9, wherein the normalized timestamp values of TCP/IP packets of the subgroup differ by no more than a predefined threshold that defines the common normalized timestamp value range.

13. The method of claim 9, wherein identifying the subgroup of the TCP/IP packets having a common normalized timestamp value further comprises sending the common normalized timestamp value and additional data of the subgroup to a cyber administrator to identify additional common traits of the subgroup.

14. The method of claim 10, wherein the TCP/IP timestamp header values represent time increments of a given time interval, and wherein calculating the normalizing timestamp value comprises subtracting the local system time from a time represented by the time increments of the given time interval.

15. The system method of claim 14, wherein the given time interval is between 1 ms and 1 second.

16. The method of claim 9, wherein a time interval of increments of a TCP/IP timestamp header value is 500 ms and calculating the normalized timestamp value comprises representing the local system time in 500 ms increments.

* * * * *